No. 857,021. PATENTED JUNE 18, 1907.
F. M. BLACK.
SIGNALING SYSTEM FOR RAILROADS.
APPLICATION FILED DEC. 15, 1902.

7 SHEETS—SHEET 2

*Train Automatically Signalling Stations.*

*Train Manually Signalling Stations.*

Witnesses:
E. E. Seidelman
E. B. House

Inventor
Francis M. Black.
By His Attorney
Warren D. House

No. 857,021. PATENTED JUNE 18, 1907.
F. M. BLACK.
SIGNALING SYSTEM FOR RAILROADS.
APPLICATION FILED DEC. 15, 1902.
7 SHEETS—SHEET 3.
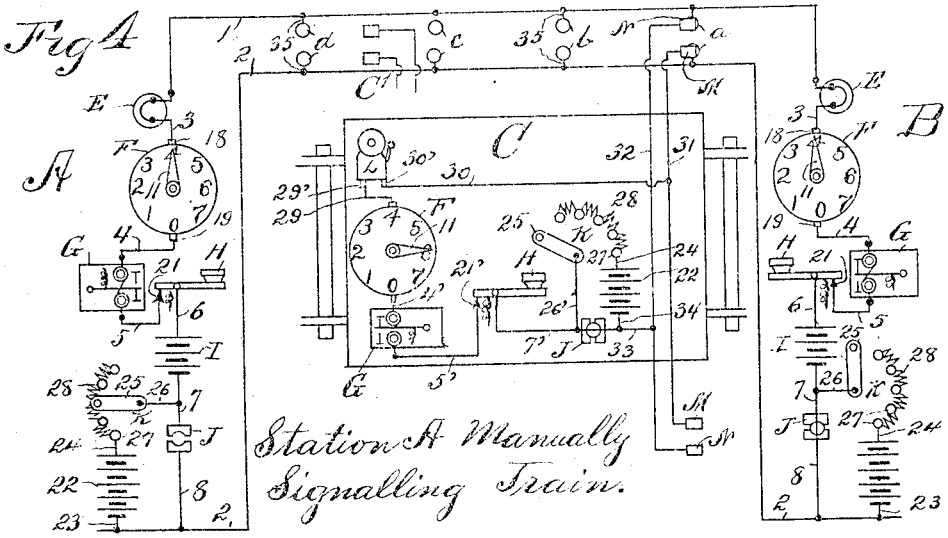
Fig 4. Station A Manually Signalling Train.
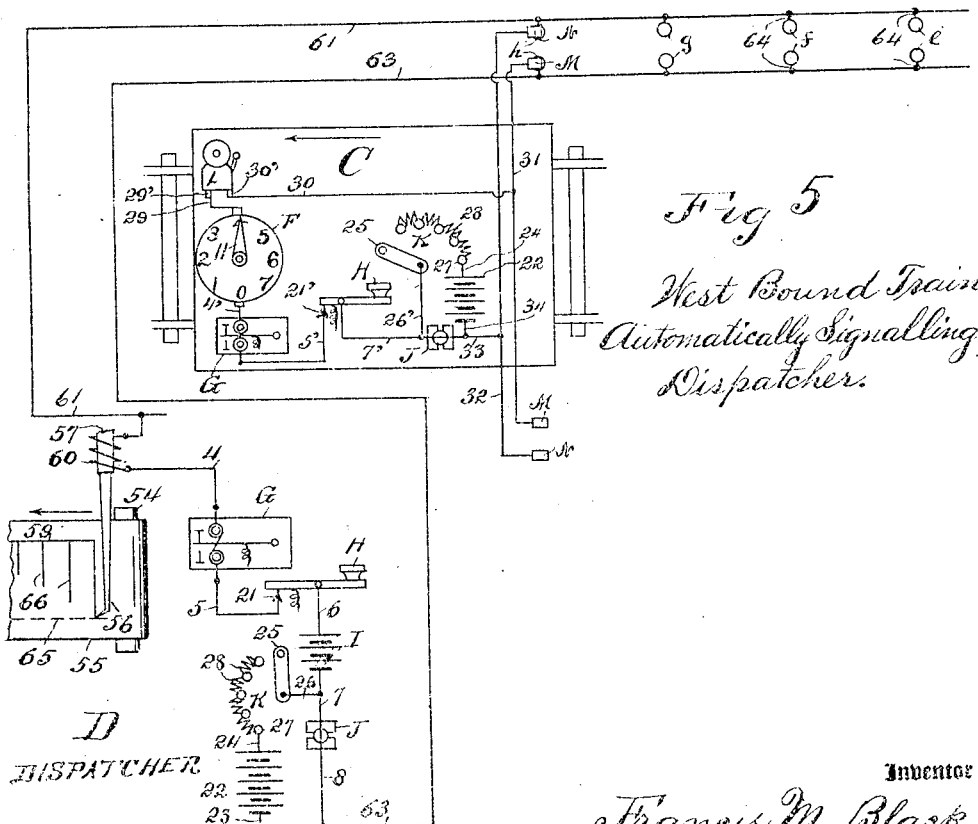
Fig 5. West Bound Train Automatically Signalling Dispatcher.
Witnesses:
E. E. Seidelman.
E. B. House.
Inventor
Francis M. Black
By His Attorney Warren D. House.

No. 857,021. PATENTED JUNE 18, 1907.
F. M. BLACK.
SIGNALING SYSTEM FOR RAILROADS.
APPLICATION FILED DEC. 15, 1902.
7 SHEETS—SHEET 4.
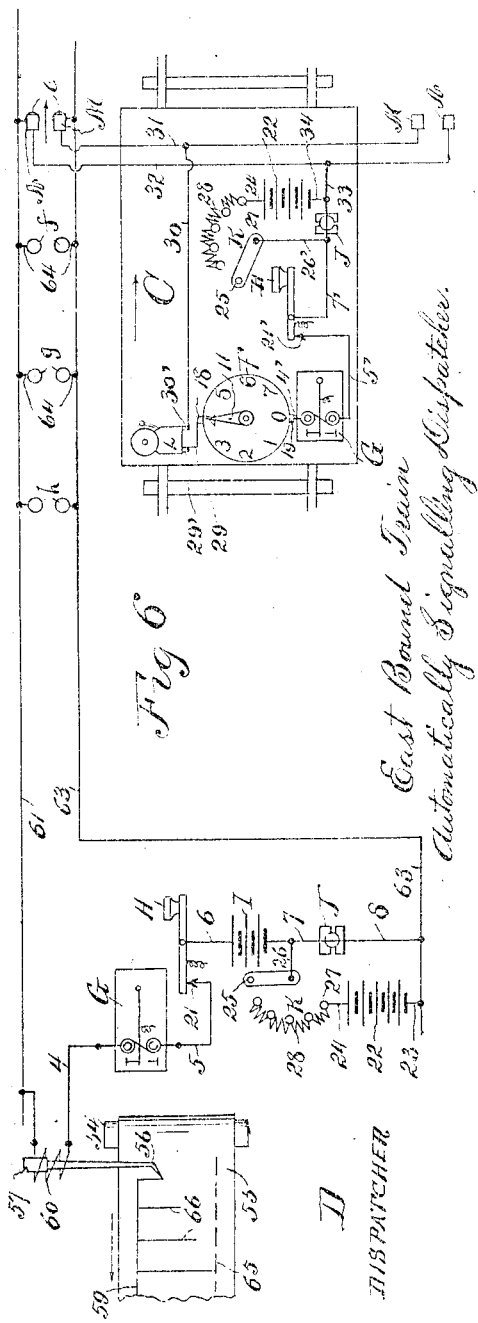
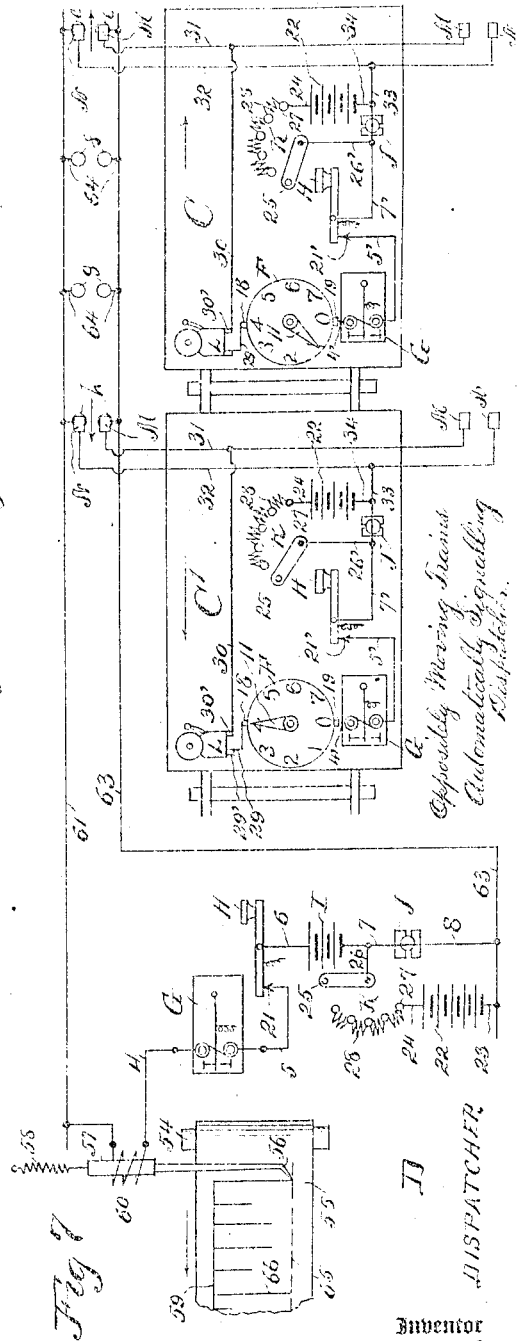
Witnesses:
E. E. Seidelman.
E. B. House.
Inventor
Francis M. Black.
By His Attorney Warren D. House.

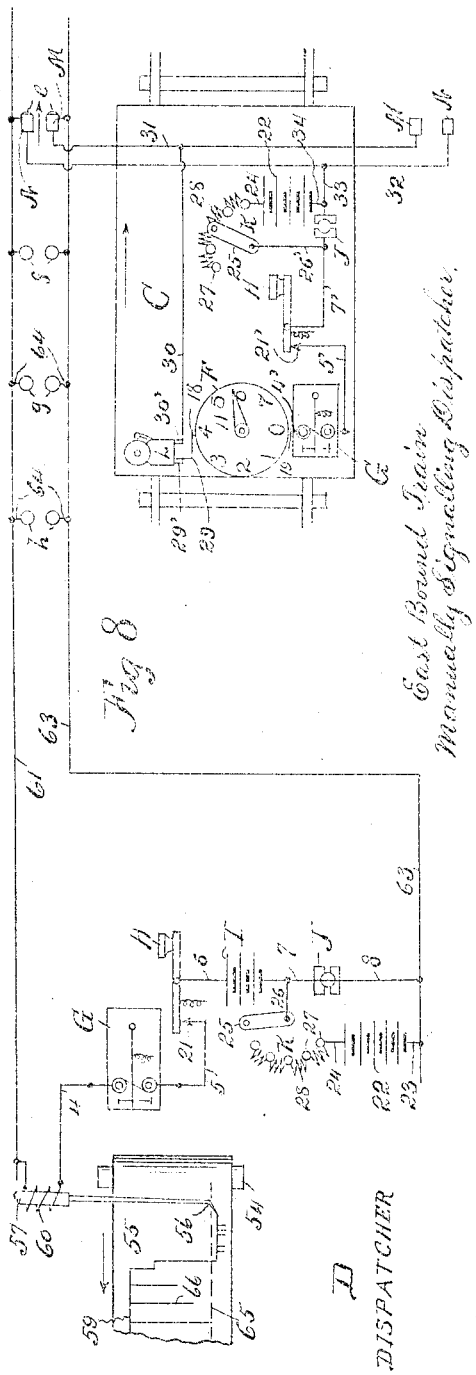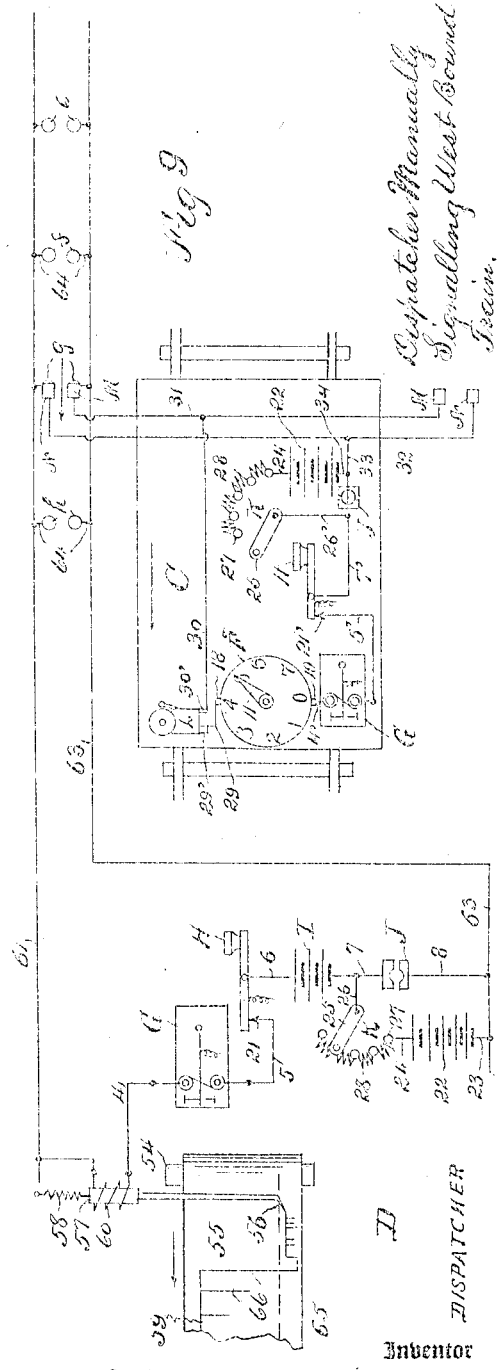

No. 857,021. PATENTED JUNE 18, 1907.
F. M. BLACK.
SIGNALING SYSTEM FOR RAILROADS.
APPLICATION FILED DEC. 18, 1906.
7 SHEETS—SHEET 6.
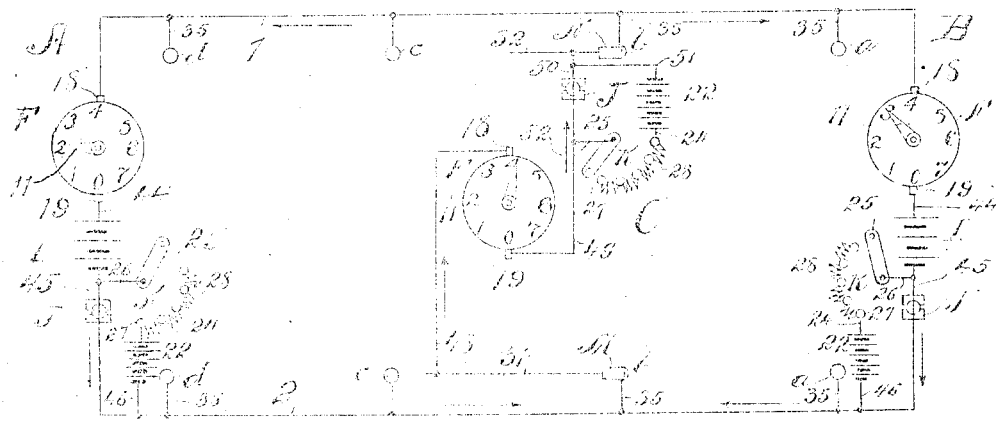
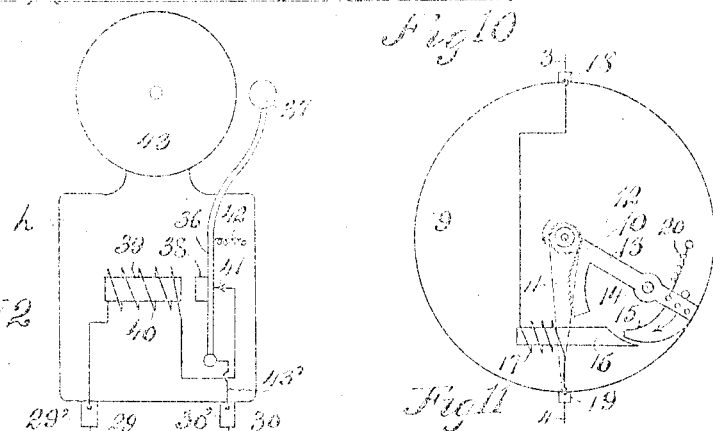
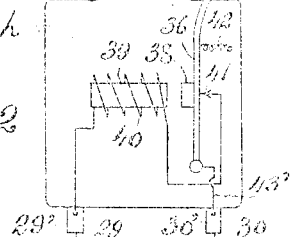
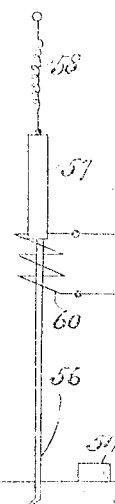
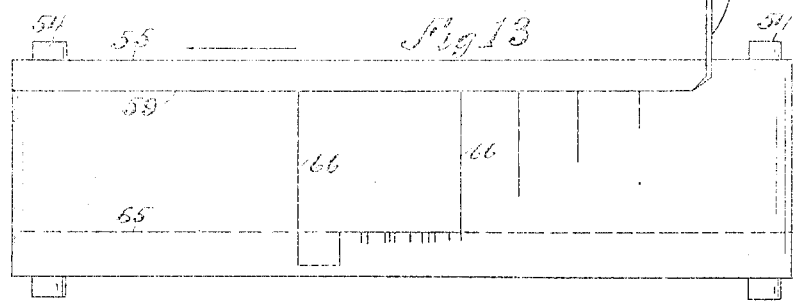
Witnesses:
E. E. Seidelman
E. B. House
Inventor
Francis M. Black,
By His Attorney
Warren D. House No. 857,021. PATENTED JUNE 18, 1907.
F. M. BLACK.
SIGNALING SYSTEM FOR RAILROADS.
APPLICATION FILED DEC. 15, 1902.

7 SHEETS—SHEET 7

All Apparatus Set for
Automatic Signalling
Grounded Circuits.

Witnesses:
E. Seidelman
E. B. House

Inventor
Francis M. Black
By His Attorney
Warren A. House

UNITED STATES PATENT OFFICE.

FRANCIS M. BLACK, OF KINCAID, KANSAS.

SIGNALING SYSTEM FOR RAILROADS.

No. 857,021.

Specification of Letters Patent.

Patented June 18, 1907.

Application filed December 15, 1902. Serial No. 135,343.

*To all whom it may concern:*

Be it known that I, FRANCIS M. BLACK, a citizen of the United States, residing at Kincaid, in the county of Anderson and State of Kansas, have invented new and useful Improvements in Signaling Systems for Railroads, of which the following is a specification, reference being had therein to the accompanying drawings, forming a part thereof.

My invention relates to a combined automatic and manually operated electric signaling system for railroads.

The objects of my invention are as follows:— to provide a reliable signaling system by which a station operator or despatcher may be kept advised of the position, direction and speed of a train or trains; to enable a station operator or despatcher to signal by electrical impulses to a train or trains, or vice versa; to enable a station operator or despatcher to communicate by telegraphic or telephonic apparatus with a train or trains, or vice versa; to automatically record the position, direction, and speed of a train or trains and signals to or from the same; and to enable train operators to ascertain the presence of other trains in the same block or section.

Other objects of my invention are hereinafter set forth.

Figure 1:
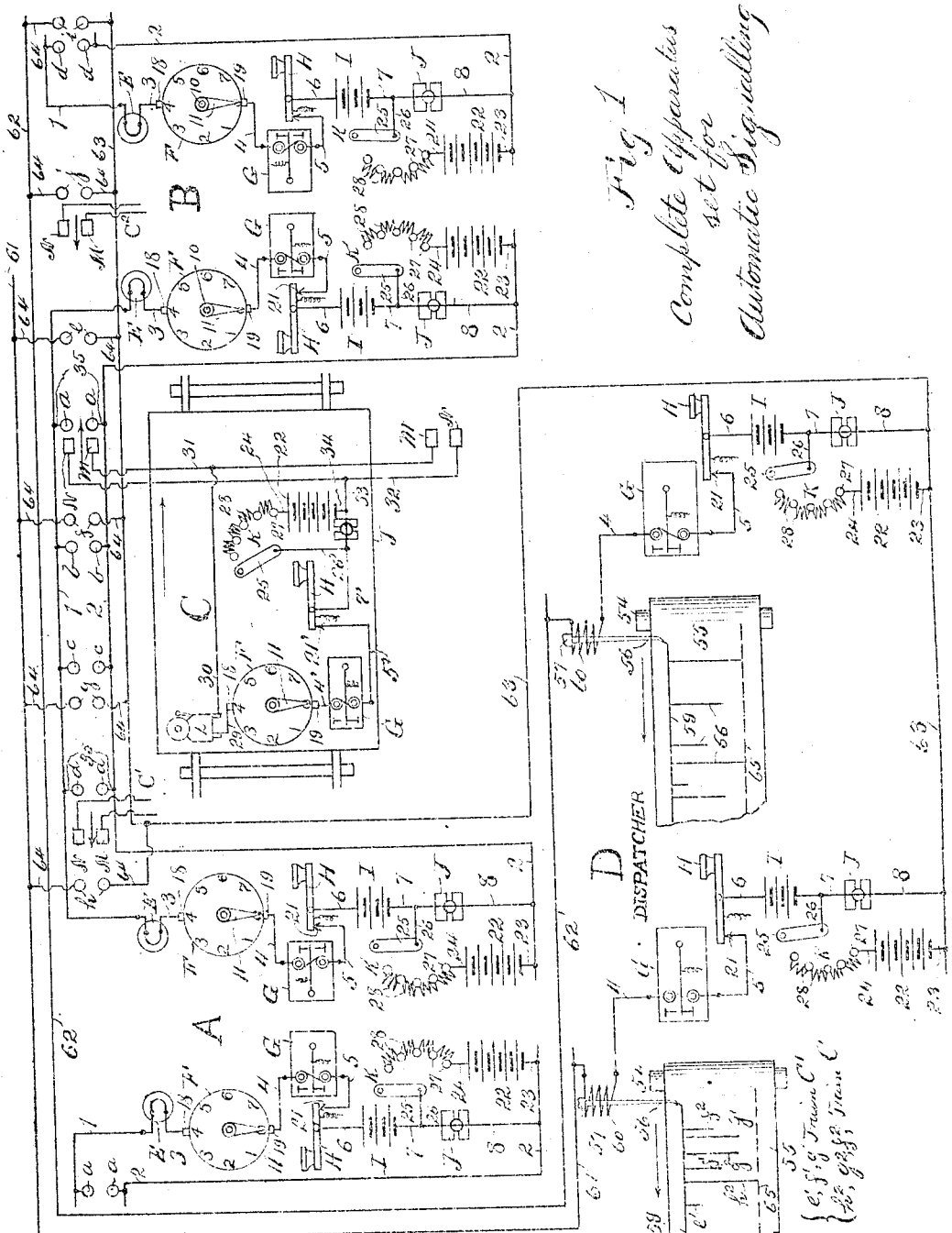
Figure 2:
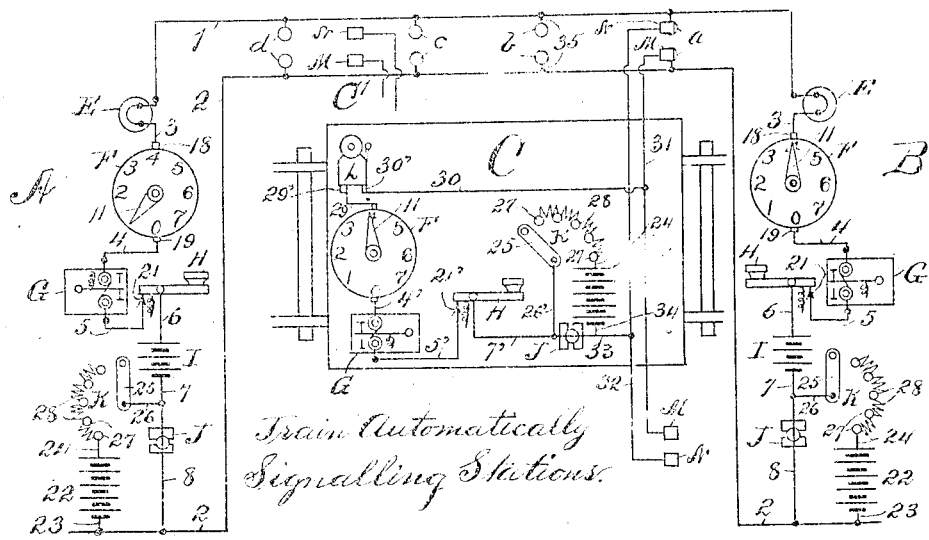
Figure 3:
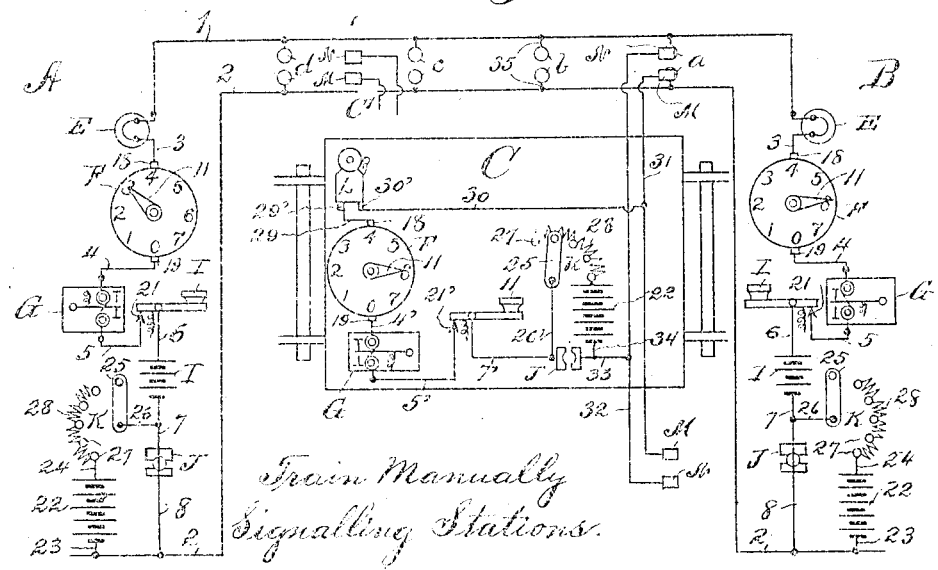
Figure 15:
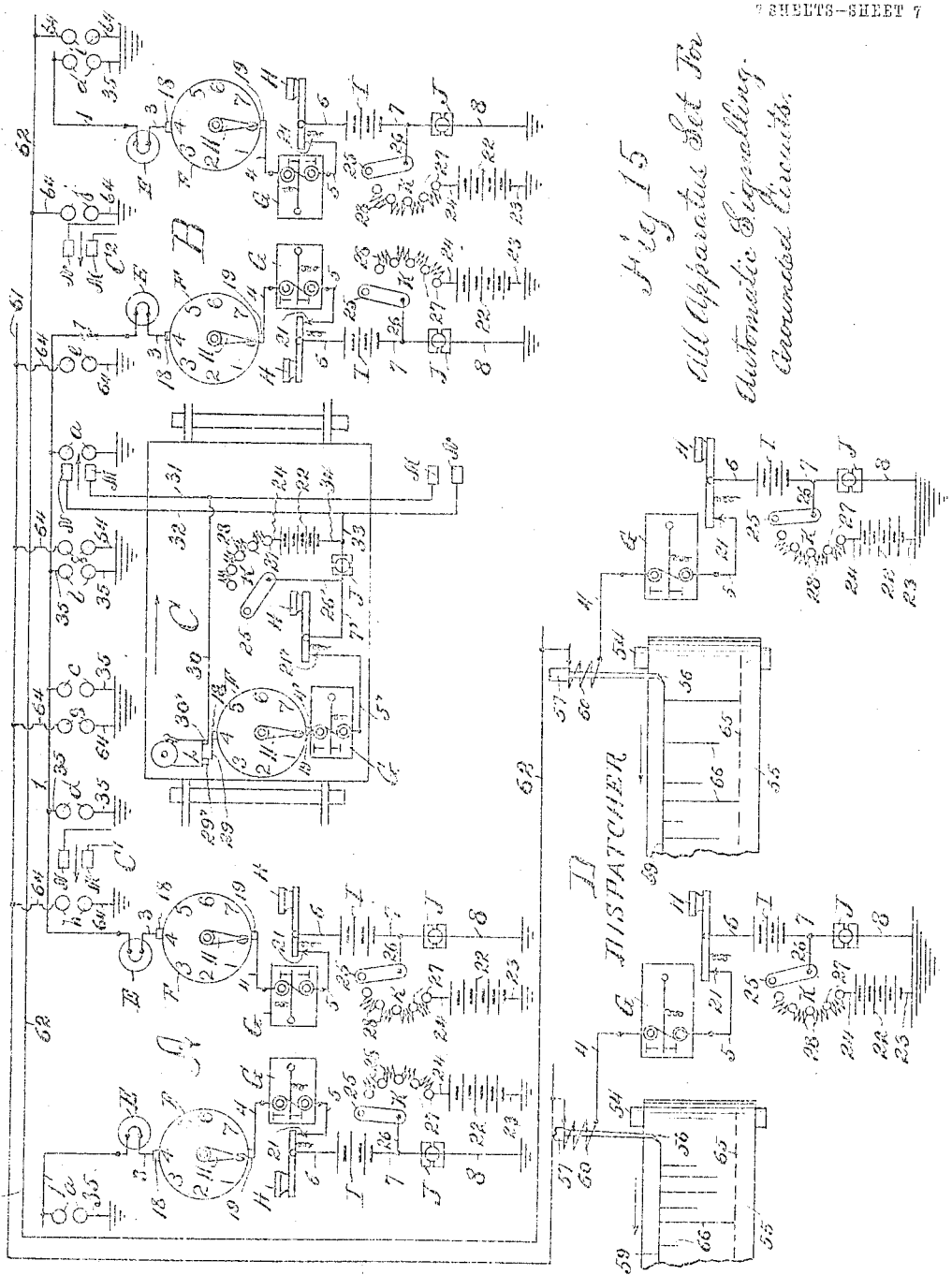

In the accompanying drawings which illustrate apparatus by means of which my invention may be carried into effect, Figure 1 is a diagrammatic view of a complete apparatus set for automatic signaling, one complete section or block being shown and portions of the blocks adjacent the two stations being shown. In this view one train or car is shown moving east between two stations, and the contact brushes of two other trains moving west are also shown. In this view none of the contact brushes are connected with the line contacts. At the despatcher's station are shown two sets of apparatus connected with two blocks or sections of the system. On the recording tapes at the despatcher's station are shown the records of the three trains in the two blocks. Fig. 2 is a diagrammatic view of apparatus in the same circuit and located at two stations. In this view a train apparatus is shown in position for automatically signaling both stations, the contact brushes of the train apparatus being shown connected with a pair of line contacts, the contact brushes of another train being shown not connected with any line contacts. In this view the dial hands of the indicators at the stations indicate the position of the train C relative to the stations. Fig. 3 is a diagrammatic view similar to that shown in Fig. 2, the apparatus being shown as it is when a train is manually signaling the two adjacent stations. Fig. 4 is a view similar to Figs. 2 and 3, the apparatus being shown as it is when a station is manually signaling a train. Fig. 5 is a diagrammatic view of one set of apparatus at the despatcher's station connected with two co-operating line conductors. In this view a train apparatus is shown connected with the near pair of line contacts, the train being west bound, as indicated by the record on the tape of the recording instrument at the despatcher's station, and the apparatus set for automatic signaling. Fig. 6 is a view similar to Fig. 5, the train apparatus being shown connected with the far pair of line contacts, and the train being east bound. Fig. 7 is a diagrammatic view of one set of apparatus at the despatcher's station and the apparatus of two oppositely moving trains simultaneously automatically signaling the despatcher from the far and near pair of line contacts respectively. Fig. 8 is a view similar to Fig. 6, showing an east bound train at rest and manually signaling the despatcher from the far pair of line contacts. In this view the recording tape at the despatcher's station shows the record of the previous progress of the train and the signals which have been received from manual manipulation of the train apparatus. Fig. 9 is a view similar to Fig. 8, the apparatus being shown as it is when the despatcher is manually signaling the west bound train. Fig. 10 is a diagrammatic view of the circuits of two connected station apparatus with opposing sources of current and a train circuit connecting opposite sides of the circuit, which includes the apparatus of the two stations, intermediate the opposing sources of current. In this view, for clearness, some parts of the apparatus are omitted. Fig. 11 is a diagrammatic view of a common form of current indicator, such as may be employed for visually denoting the positions, directions and speed of trains and for receiving signals from trains at an operator's station. Similar indicators may be employed for similar purposes in the train circuits. Fig. 12 is a diagrammatic view of a common electric bell such as may be employed in the train circuits for giving audible signals. Fig. 13 is a diagrammatic view of a common form of electric recording instrument which may be employed in connection with my invention for recording the position, direction and speed of trains and signals to and from the same. Fig. 14 is a diagrammatic view of two pairs of contact brushes employed on each train and the conductors which respectively connect corresponding brushes. In this view two of the brushes of opposite pairs are shown electrically connected, as is the case, when the brushes are used only for signaling automatically to the stations and the despatcher, and the train circuit is not provided with indicating or other signaling means. Fig. 15 is a view similar to Fig. 1, the ground being employed for the return conductors of the several circuits.

Similar characters of reference denote similar parts.

A and B denote two adjacent intermediate stations.

C denotes a car or train, and D denotes the despatcher's station located at any suitable place on the line of railway. All stations excepting the ones at the end of the line are provided with like equipment. At each station A—B are two identical sets of apparatus which are respectively connected in circuit with line conductors 1 and 2 which extend in opposite directions from each station and connect with corresponding sets of apparatus at the two adjacent stations at either side.

Each set of apparatus at a station A or B comprises the following named elements:— a glow lamp E, current indicator F, sounder G, key H, battery or other electrical generator I, and circuit making and breaking device, such as a plug switch J, all connected in series with each other in the order named by means of the connecting conductors 3, 4, 5, 6 and 7 respectively. The switch J is connected by a conductor 8 with the line conductor 2. It will be understood that the relative positions of the elements named may be changed without interfering with their operation. Any current indicator F may be employed. For this purpose a current strength indicator is preferred, and in Fig. 11 is illustrated an ordinary current strength indicator that will meet the requirements.

Referring to Fig. 11, which is a diagrammatic view showing the rear side of the instrument, 9 denotes a disk having on one side a dial face with characters arranged in a circle and denoting current strength. 10 is a transverse rotary shaft extending through the disk 9 and having on its forward side an indicating hand 11 for pointing to the numerals or other characters on the dial face. To the rear end of the shaft 10 is secured a pinion 12 which meshes with a gear segment 13 rotatively mounted on a pin 14 secured to the disk 9. Attached to the gear segment 13 is an iron armature 15 disposed adjacent to one end of a core 16 of a magnet the helix 17 of which is connected at one end to one binding post 18, the other end of the helix being connected to the other binding post 19. A coil spring 20 is secured at one end to the disk 9 and at the other end to the segment 13. The spring 20 retracts the segment to the initial position shown in Fig. 10. When the helix 17 is energized by a current passing therethrough the armature 15 will be swung against the pull of the spring 20 a distance corresponding to the strength of the current passing through the helix, and the hand 11 will thus indicate on the dial the strength of the current. Conductor 3 connects the binding post 18 and lamp E, and conductor 4 connects binding post 19 with one terminal of the helices of the sounder G, the other terminal of said helices being connected to the conductor 5 which connects with a contact 21 against which the key H normally rests. The sounder G and key H are of the ordinary pattern and require no description. Each set of apparatus at each station A and B is provided with an extra current generator such as a battery 22 to enable the operator at the station to send to the train or car C signals other than those he may send by manipulating the key H. One pole of this battery 22 is connected by a conductor 23 with the line conductor 2, the other pole being connected by a conductor 24 with one contact of a variable resistance device of any common type. In the drawings I have illustrated as such variable resistance device a rheostat K having a lever 25 connected by a conductor 26 with the conductor 7. Said lever is adapted when properly swung to successively strike a plurality of contacts 27 connected in series with each other by a series of resistance coils 28, one of said contacts being connected to the conductor 24. By swinging the lever 25 the battery 22 may be cut out of circuit or its current may be utilized in full or part for sending signals which shall operate certain devices carried by the car C and which will now be described. Each train may have a car provided with an apparatus having the same kind of instruments as constitute one set at the station A or B, and connected in a similar manner excepting that for the lamp E on the car is substituted an ordinary electric bell L one binding post 29' of which is connected by a conductor 29 to the binding post 18 of the indicator F. The other binding post 30' of the bell L is connected to a conductor 30 which is connected to a conductor 31 the ends of which are connected respectively to two contact brushes M disposed at opposite sides of the car C. The car also carries at opposite sides two other contact brushes N connected with each other by a conductor 32 to which is connected a conductor 33 which is connected to the circuit closing device J on the car in a manner similar to the conductor 8 and device J at the station. A conductor 34 is connected to the conductor 33 at one end and at the other end to the pole of the battery 22 on the car C corresponding to the pole to which is connected the conductor 23 at the station. The disposition of the contact brushes M and N at each side of the car is such that the adjacent brushes M and N will respectively connect simultaneously with two oppositely disposed contacts connected respectively to the line conductors 1 and 2 by the conductors 35. Disposed at suitable distances apart between the stations A and B are a series of pairs of such contacts denoted respectively by $a, b, c, d$.

In Fig. 12 is diagrammatically represented an electric bell of common construction and of a type suitable for use with my improved system of signaling. Referring to said Fig. 12, 36 denotes the swinging bar carrying the clapper 37 and armature 38 disposed opposite the core 39 of a magnet, the helix 40 of which has one end connected to the binding post 29' to which is connected the conductor 29. The other end of the helix is connected to a contact 41 against which the bar 36 is normally held by a spring 42 connected at one end to the bar and at the other end to the base L. A conductor 43' is connected to the bar 36 and to the binding post 30' of the bell. When a current of sufficient strength traverses the helix 40 the armature 38 will be drawn toward the core 39 against the tension of the spring 42 thus causing the clapper 37 to strike the gong 43 and at the same time breaking the circuit at the contact 41. Only such currents will operate the bell L as are greater than such currents as are normally used for automatic and manual signaling. The binding post 19 of the indicator F on the car C is connected by a conductor 4' with the terminal of one of the helices of the sounder G on said car, the other terminal of said helices being connected to a conductor 5' which connects with a contact 21' against which the key H on the car normally bears. The key H of the car is connected by a conductor 7' with the plug switch J on the car, which switch is connected to the conductor 33 as previously described. The lever 25 of the variable resistance K on the car is connected by a conductor 26' with the conductor 7'. It will be noted that if the position of the car C is reversed on the track, from the position shown in Figs. 1, 2, 3 and 4, that the other brushes M and N will be positioned so as to engage the same contacts respectively as are engaged by the opposite pair of brushes when the car is positioned as shown in said figures. The current in the train circuit will always pass in the same direction for this reason. The batteries I at opposite stations are so disposed in the circuit that they will normally oppose each other, and being of substantially equal strength, when the car brushes M and N are not in contact with any of the line contacts no current will flow through the circuit, but when the brushes M and N do make contact with any pair of contacts connected with the line conductors 1 and 2 the train circuit will connect opposite sides of the station circuit, thus forming two circuits, in which the united currents of both batteries I pass in one direction through the car circuit. Thus each station indicator and so under G is operated by its own battery I, and the strength of the current in the circuit will depend upon the position of the car, that is, whether its brushes are on the contacts $a, b, c$ or $d$, as more resistance will be in the circuit of any given station when the car brushes are connected with distant than with nearer contacts. The current strength in any station circuit therefore depends upon the position of the car relative to such station at the time contact is made. The indicators F which denote the current strength at the stations A and B will therefore indicate the position of the trains in the blocks in which such indicators are located. The batteries 22 at the stations are provided so that the train may be signaled to stop by the bell L and communication by a predetermined code be had with the train operator. The arrangement of the batteries 22 is such that they will be in series with and assist the adjacent batteries I when said batteries 22 are cut into the circuit as described hereinafter. The battery 22 on the car C is so connected with the train circuit that when said battery is cut into circuit as later described, the current from said battery will pass in the same direction in the train circuit as the currents from the batteries at stations A and B.

By referring to Fig. 10 a clear idea may be obtained as to the passage of the currents through the circuits when the train circuit is in circuit with the station circuits. In this view the line conductor 1 is shown connected at its ends to the binding posts 18 of the two station indicators. Batteries I are connected by conductors 44 with binding posts 19 of indicators F respectively. Conductors 45 connect the other poles of the batteries I with the plug switches J which are connected respectively with the line conductor 2. Batteries 22 are connected by conductors 46 with conductor 2, and rheostat levers 25 are connected by conductors 47 with conductors 45 respectively. On the car C conductor 31 attached to brush M is connected by conductor 48 with binding post 18 of the indicator F of the car, the other binding post of which is connected by conductor 49 with the plug switch J of the car which is connected by conductor 50 with conductor 32 connected to brush N. Conductor 51 connects the carbon pole of the battery 22 of the car with conductor 50, and conductor 52 connects lever 25 with conductor 49. With the plug switches J closed and the rheostat levers 25 in the open positions, as shown in Fig. 10, the currents from batteries I will pass by conductor 2 to the brush M by way of contact $b$, connected by conductor 35 to conductor 2. Thence the currents will pass by conductors 31 and 48 to the car indicator F, thence through said indicator and by way of conductor 49, plug switch J, conductors 50 and 32 to brush N, thence by the opposite contact $b$ and conductor 35 to conductor 1 in which the current divides and passes in opposite directions to the station indicators F, and thence by conductors 44 back to batteries I. On the dial faces of the indicators F, at the stations, the points are arranged so that they correspond respectively to the contacts $a$, $b$, $c$, and $d$. Thus when a train enters a block, the hand of the indicator F at the distant station will successively point to the numerals 1, 2, 3 and 4 on the dial face as the train brushes M and N successively strike contacts between the terminals of the block. Thus, for instance, referring again to Fig. 10, with both batteries in circuit at both stations A and B, and with the brushes M and N on the train on contacts $b$, the indicator hand 11 at station A, which is farther from contacts $b$ than station B, would point to "2" on the dial face, while at station B, the indicator hand 11 of the indicator at station B would point to "3," which numeral would represent at station B the contacts $b$, the same contacts being represented at station A by the numeral "2" on the dial face at the latter named station. The indicator F on the train being actuated by the sum of the two currents from the stations will denote the nearness to a station by the position of its hand 11.

Referring again particularly to Figs. 1, 2, 3 and 4, it will be noted that the car C carries no battery corresponding to the batteries I, the sounder G, indicator F, and bell L on the car being operated by the currents derived from the stations, the battery 22 on the car being employed to communicate with the station operators and despatcher. When the station and car apparatus are set for automatic signaling, as shown in Fig. 1, the plug switches J and the keys H at the stations and on the car are all closed, and the variable resistance levers 25 are swung off from the contacts 27 so as to cut out the batteries 22. With the apparatus in the condition shown in Fig. 1, and no car brushes on the contacts $a$, $b$, $c$ or $d$, the coöperating apparatus at stations A and B will be in closed circuit with each other, and the batteries I being opposed to each other no current will be flowing through the circuit in which the stations are located. In this condition of affairs, all the hands of the station indicators F and of the indicator F on the car will point to zero on the dials this character denoting the initial point on each dial. If now a train denoted by C, as shown in Fig. 2, enters the block and the brushes M and N strike the contacts $a$ of said block, the train circuit of which the brushes are the terminals will bridge the circuit between the stations A and B, thus, as described hereinbefore, creating two circuits in which are located respectively the apparatus at the two stations. The batteries I at stations A and B are of such strength that the indicator hands 11 of stations A and B will point respectively to the dial characters "1" and "4," thus denoting the current strength, and by prearrangement the position of the train relative to the two stations. The united currents from batteries I of the stations passing through the train circuit from brush M by conductors 31 and 30, bell L, conductor 29, indicator F, conductor 4', sounder G, conductor 5', contact 21', key H, conductor 7', plug switch J, conductors 35 and 32 to brush N, will cause the indicator hand of the car indicator F to swing to positions intermediate zero and "4," the hand, at the contacts contiguous the stations, pointing to "4" and then successively indicating numerals of decreasing value as the train nears the middle of the block, and from the middle of the block successively denoting numerals of increasing value until the contact next a station is struck when the car indicator hand will indicate "4" again.

If the train operator desires to communicate with a station by the manually operated mechanism, and the brushes M and N are on a pair of contacts, as for instance contacts $a$, as shown in Figs. 2 and 3, he opens the train switch J and swings the lever 25 onto the contacts 27 of the train variable resistance K, thus cutting into circuit the train battery 22. This battery is arranged so that it unites with the currents from batteries I. Then by means of a prearranged code, the train operator may by means of lever 25 signal stations A and B, and thus denote with which station operator he wishes to communicate. The other station operator may then open his key H or switch J, after which the train operator may communicate with the connected station either by means of the key H or lever 25 of the train, and the signals received by the station in circuit may be translated or read by the operator at said station by means of the lamp E, sounder G, or indicator F, as desired. Or the operator at the station in circuit may communicate with the train operator in a like manner, the signals being interpreted by the train operator by his sounder G, or indicator F. Or the train operator may communicate with both stations simultaneously by having both operators leave their instruments in circuit with the line. The glow lamps E also notify the operator at a station every time a train in the block strikes a pair of contacts.

If with the apparatus as shown in Fig. 2, the operator at station A wishes to manually signal the train operator, he opens switch J at station A and swings lever 25 onto contacts 27, as shown in Fig. 4. The lever 25 is first swung onto the last contact 27 connected with conductor 24, thus throwing the battery 22 at station A into circuit with the batteries I at both stations. The united currents will operate the train bell L. The train will then be stopped with its brushes on a pair of contacts, as a, as shown in Fig. 4. In this position of the brushes, the dial hand 11 of the indicator at station B, being actuated only by the battery I at station B, will swing to the character "4" of indicator F at station B. If the operator at station A desires to communicate with the train operator by means of his key H, the train operator will notify the operator at station B to open his switch J or key H, after which the operator at station A may communicate by key. Or he may employ the lever 25 for this purpose, if he so desires. By observing the dial hand 11 at station A the operator at such station may see the character of signals he is sending the train operator. When one station is cut out of circuit, the hands 11 of the indicators of the other station and of the train will move synchronously when signals are sent. By observing the hand 11 at his station an operator may determine the direction of movement of the trains, and by noting the intervals of time between indicator signals, he may learn the speed of movement of such trains.

When two trains desire to communicate with each other, they stop respectively with their brushes on the adjacent contacts, at which time the train circuits together with the conductors 1 and 2 will form a circuit between the two trains. At such times the operators at both stations should open their keys H or plug switches J, and the train operators may then communicate with each other by employing the levers of the variable resistance devices K on such trains. By swinging the levers onto the contacts 27 and opening the train switches J, the train operators may signal with either the levers 25 or the keys H on said trains, the signals being interpreted by means of the sounders G, or dial hands 11 on the trains. With two trains so located, a station operator may communicate with either train by having the other station and train operators open their switches J or keys H. When a car is not supplied with signaling apparatus, the brushes M and N may be connected with each other in any suitable manner, as by a conductor 53, as shown in Fig. 14.

Now follows a description of the train despatcher's apparatus:—At the despatcher's station D may be located one or more sets of apparatus, each identical with the other and of a number corresponding to the length of line of railway or to the number of trains operated on the line. In the drawings I have illustrated two identical sets of apparatus. Referring particularly to Figs. 1, 5, 6, 7, 8, 9 and 13, it will be noted that each set of apparatus at the despatcher's station D is provided with a sounder G, a key H, a battery I, plug switch J, connected respectively with each other by conductors 5, 6 and 7, in the same manner as are connected the similar elements at station A and B. Each set of apparatus at the despatcher's station D is provided with a variable resistance device K having one contact 27 connected by a conductor 24 with one pole of an extra source of current generation, such as a battery 22. The variable resistance K is provided also with a lever 25 adapted to successively connect with contacts 27 and connected by a conductor 26 with the conductor 7 of the set. In lieu of the indicator F and lamp E a current strength recording instrument is used in each set at the despatcher's station. Any ordinary form of instrument which will record current strength may be used. In Fig. 13 I have illustrated diagrammatically a current strength recording instrument of an ordinary type which may be employed in connection with my improved system of signaling. This form of instrument is provided with means, such as two rollers 54 for carrying a longitudinally movable tape 55, rotation being imparted to the rollers 54 in any suitable manner. A stylus or pen 56 provided with any known means for making marks on the tape 55 is secured at one end to one end of a solenoid core 57 which is reciprocative in a direction transversely to the direction of movement of the tape 55, so that the pen 56 may make transverse as well as longitudinal marks on the tape. Attached to the core 57 is a coil spring 58 which normally retracts the core to a position in which the pen 56 will make a continuous line denoted by 59 on the tape 55. The helix 60 of the solenoid is disposed so that when energized it will move the core 57 in a direction opposite that in which the core is moved by the spring 58. From station D line conductors corresponding in number to the number of sets of instruments at such station extend parallel with the line of railway, such line conductors being denoted by 61 and 62. Corresponding terminals of the helices 60 are connected respectively to said conductors 61 and 62, the other terminals of said helices being connected by conductors 4 to corresponding terminals of the sounder G helices, the other terminals of which are connected respectively to the conductors 5 as before described. Conductors 23 connect respectively the carbon poles of the extra batteries with a return conductor 63, which extends parallel with the conductors 61 and 62 along the railway line. Conductors 8 connect respectively the plug switches J at station D with conductor 63. Intermediate the stations along the railway are located at suitable intervals a plurality of pairs of contacts, the pairs being adapted to be placed consecutively in connection with the brushes M and N of a car, in the same manner as described with reference to contacts $a$, $b$, $c$ and $d$. The conductor 61 extends any suitable distance, as between stations A and B and has connected to it tap conductors 64 which connect respectively with contacts $e$, $f$, $g$ and $h$ disposed respectively opposite similar contacts, similarly denoted and which are connected by similar conductors 64 with the return conductor 63. The conductor 62 extends beyond the conductor 61 and is also connected by tap conductors 64 with contacts $i$ and $j$ disposed opposite similar contacts similarly connected by conductors to the return conductor 63. A train moving from block to block will successively strike with its brushes the contacts connected respectively with the conductors 61, 62 and 63, as well as the contacts connected with line conductors 1 and 2.

For automatic signaling the apparatus is set as shown in Fig. 1, the plug switches at the station D being closed and the levers 25 thrown to the open position, thus leaving only the batteries I at station D in circuit. While in this condition no signals are coming in to station D and the pens 56 will draw on the tapes the longitudinal lines 59. If now a train with its apparatus as shown in Fig. 5 strikes a pair of contacts, as for instance contacts $h$, the circuit in which is located the set of apparatus at the left in station D will be closed through the train circuit, and the current from battery I of said set will actuate the indicator F in the car circuit. At the same time the helix 60 of the set now in circuit will be energized an amount corresponding to the strength of the current passing over the circuit, and the core 57 will be moved against the pull of the spring 58 in a direction such that a transverse line will be made on the tape 55 by the pen 56 connected to such core. The length of this transverse line will correspond to the current strength and the current strength will depend upon the resistance in the line. If the brushes are at contact $e$, the distant contacts, the line will be short, owing to the resistance of the line. If the brushes are, as shown in Fig. 5 on the near contacts $h$ the line will be long and reach the longitudinal dotted line 65 on the tape 55. Thus by observing the length and distance apart of the transverse lines on the tape the despatcher is enabled to determine the location and speed of a train. By observing whether the transverse lines run from short to long or long to short on the tape, the despatcher is enabled to determine the direction of the train. Thus, referring to Fig. 1, on the left tape 55 the despatcher can see that train C' which made the marks $e'$, $f'$ and $g'$ is moving west, and is between contacts $g$ and $h$. At the same time he can see that train C which made the marks $h^2$, $g^2$, $f^2$ is moving east and is between contacts $e$ and $f$. If the train C, as shown in Fig. 5 were to remain for a period of time with the brushes M and N in contact with the contacts $h$, a longitudinal line would be drawn by the pen 56 corresponding to the dotted line 65 on the left tape 55.

In Figs. 5 and 6 are shown respectively on the tapes the records made by trains bound respectively west and east. In Fig. 7 is shown the record made on the tape by two oppositely moving trains traveling during the same period of time in the same block. For automatically signaling the keys H at the despatcher's station and on the trains are closed, the levers 25 being open. If a train having its brushes in contact with the contacts $e$, as shown in Fig. 6 and 8 desires to manually communicate with the despatcher, the train operator opens the plug switch J on the car and throws the lever 25 onto the contacts 27 of the variable resistance device K on the car, as shown in Fig. 8. The battery 22 on the car now being in the circuit with the helix 60 in said circuit, the added strength of the current will move the core 57 so as to move the pen 56 beyond the dotted line 65 on the tape 55, after which the operator on the car by moving the lever 25 to and fro may cause to be made on the tape marks 66 corresponding to any prearranged code. By noting the position of the hand 11 of his indicator F, the train operator may determine to what position to move the lever for this purpose.

In Fig. 8 the record on the tape shows that an east bound train at contacts $e$ manually signaled the despatcher, and that the train was still at such contacts. If the despatcher desires to signal a train, which is moving west between contacts $f$ and $g$, for instance, the despatcher opens the left switch J and throws the lever 25 in circuit with contacts 27, so that lever 25 will be in contact with the contact connected with conductor 24 in said circuit. When the brushes M and N of said train strike contacts $g$, the full battery strength from battery 22 in the circuit and at station D will cause the bell L on the train to ring, and the train will be stopped with the brushes on contacts $g$. The despatcher may, after retracting the lever, say to the position shown in Fig. 9, manually signal to the train operator by the key H or by properly swinging the lever 25 to and fro. In Fig. 9, the tape record shows that a west bound train was stopped at contact $g$ and that the despatcher then manually signaled to the train operator, the longitudinal dotted lines following the long transverse line denoting that the despatcher had caused the bell L on the train to ring. The lengthwise movement of the tapes 55 is comparatively slow, so that short impulses, as are sent in ordinary signaling make lines substantially at right angles to the movement of the tapes. In case that two trains in a block simultaneously strike different pairs of contacts, the pen 56 would make on the tape a transverse mark corresponding in length to the sum of the strength of the current, and the despatcher in such a case would determine the present position by inspecting the lines previously drawn on the tape. Instead of using metallic return conductors 2 and 63 the ground may be substituted for these conductors, as is shown in Fig. 15.

Referring to Fig. 15, it will be noted that conductors 8, 23 and 35 of the station circuits are run to ground instead of being connected to conductor 2. And it will also be noted, by reference to the same figures, that conductors 8 and 23 and tap conductors 64 run to ground instead of connecting with the line conductor 63, as shown in Fig. 1. This manner of using the ground return in lieu of a metallic return is well known. The operation of the system provided with a ground return, as illustrated in Fig. 15, is in the main the same as the manner of operation as already described with reference to the metallic system, as illustrated in Fig. 1.

It will be obvious to one skilled in the art to which my invention appertains, that other suitable forms of current strength recording instruments, current strength indicating instruments, and signal sending and receiving instruments than those shown and described may be employed in connection with my signaling system, and that various modifications of my invention may be made within the scope of the appended claims without departing from the spirit of my invention.

Claims.

1. The combination with suitable wiring, of means for recording current strength, and means by which said recording means may be actuated by electrical impulses traversing said wiring to indicate the positions of a plurality of trains.

2. The combination with a current strength recording means, of means in an electric circuit for locating the position of trains.

3. The combination of two main line wires joined through opposing batteries, means on a car for connecting these wires between the batteries, thus closing two circuits, and current strength indicators at each end of the main lines.

4. In an electric signal system for railways, the combination with a current strength indicator located at a station, of means by which said indicator is actuated to denote the positions of a plurality of cars.

5. The combination with suitable wiring, of two current strength indicators located one at each of two stations, and means by which electrical impulses traversing said wiring actuates said indicators to denote intermittently the positions of a plurality of trains between said stations.

6. The combination with a railway line and a car, of an instrument for recording current strength, a battery in a variable resistance, all carried by the car, and means for cutting said battery and variable resistance into circuit with said instrument, substantially as described.

7. In combination with a railway line, a car, and a station, of an instrument for recording current strength, a battery, and a variable resistance, all at the station; a pair of line conductors to which said station apparatus is connected, a series of spaced supports arranged along the line close to the track, a pair of insulated contact pieces fixed upon each of said supports, said contact pieces being connected to said line conductors, and a pair of contact-brushes carried by the car in position to contact successively with said pairs of contact pieces, substantially as described.

8. The combination with current strength recording means, of means by which said recording means is actuated to indicate the positions and directions of a plurality of trains.

9. The combination of two line conductors, a series of spaced pairs of insulated contact-pieces connected to said line conductors, a car, a pair of brushes carried by the car in position to engage the contact-pieces of each pair successively, battery in the car, means for connecting said battery to said brushes, and a current strength recording instrument connected to said conductors, substantially as described.

10. The combination of two line conductors, a series of spaced pairs of insulated contact-pieces connected to said line conductors, a car, an indicating instrument therein, a pair of contact-brushes carried by the car in position to successively engage said contact-pieces, a battery, and a current strength recording instrument, said recording instrument always being connected to said line conductors, and means for cutting said battery into circuit with said line conductors for sending special signals, substantially as described.

11. The combination with a railway line and a car, of a series of spaced pairs of insulated contact-pieces arranged close to the track, two line conductors connected by taps to said contact-pieces, an indicating instrument in the car, a pair of contact brushes carried by the car in position to successively engage said pairs of contact-pieces, said brushes being connected to said indicating instrument, and a despatcher's apparatus connected to said line conductors, said apparatus comprising a battery, a variable resistance, an instrument for recording current strength, and means for cutting said battery into the line circuit for signaling purposes, substantially as described.

12. In an electrical signaling system for railroads, the combination of a plurality of recording devices at the despatcher's office having means for recording current strength and means for actuating the same, with a system of wiring whereby the recorders record the positions and directions of trains in their respective blocks.

13. The combination with current recording means, of means by which said recording means is actuated to record the directions of a plurality of trains.

14. The combination with current indicating means located at a station, of means by which said indicating means is actuated to indicate the directions of a plurality of trains.

15. The combination with current strength recording means, of means by which said recording means is actuated to record signals from a train.

16. The combination with means for recording current strength, of means by which said recording means is actuated to record the position of a train and signals therefrom.

17. In a railway electric signaling system, a plurality of train circuits, a single indicating instrument common to all of said circuits, and means in said instrument whereby the position of each of the trains in the various train circuits may be indicated.

18. In a railway signaling system, a plurality of train circuits, a single indicating instrument common to all of said circuits, and means in said instrument whereby the speed of the trains in the various train circuits may be indicated.

19. In a railway signaling system, a plurality of train circuits, a single indicating instrument common to all of said circuits, and means in said instrument whereby the direction of the trains in the various train circuits may be indicated.

20. In a railway signaling system, a plurality of train circuits, a single indicating instrument common to all of said circuits, and means in said instrument whereby the speed and direction of the trains in the various train circuits may be indicated.

21. In a railway signaling system, a plurality of train circuits, a single indicating instrument common to all of said circuits, and current strength recording means in said instrument whereby the position, speed and direction of the trains in the various train circuits may be indicated.

22. In a railway electric signaling system, a plurality of train circuits, a recording instrument common to all of said circuits, said recording instrument comprising a constantly moving tape, and current strength recording means whereby train position, speed and direction indications in any of said train circuits may be legibly imposed or super-imposed upon said tape.

23. In a railway electric signaling system, a plurality of train circuits, a recording instrument common to all of said circuits, said recording instrument comprising a constantly moving tape, and current strength recording means whereby train position, speed and direction indications in any of said train circuits may be legibly imposed or super-imposed upon said tape concurrently with code signal indications through said train circuits.

24. In a railway electric signaling system, a main signaling circuit, an electric indicating instrument therein, a local train circuit adapted to close said main circuit, means in the local train circuit for passing signals to said indicator, and means in said local circuit for controlling the activity of said indicator.

25. In a railway electric signaling system, a main signaling circuit, a signal indicator therein, a local train circuit adapted to close said main circuit, and means in said local train circuit for actuating said indicator according to code and simultaneously controlling the energy of the code impulses.

26. In a railway signaling system, a plurality of train circuits, a single indicating instrument common to all of said circuits, and current strength recording means in said instrument whereby the position and speed of the trains in the various train circuits may be indicated.

27. In a railway signaling system, a plurality of train circuits, a single indicating instrument common to all of said circuits, and current strength recording means in said instrument whereby the position and direction of the trains in the various train circuits may be indicated.

28. The combination in an electric circuit, of two opposed electrical generators located in said circuit, a current strength indicator in said circuit, and means connected with a car for electrically connecting opposite sides of said circuit intermediate said generators.

29. The combination in an electric circuit, of two opposed electrical generators located in said circuit, two current strength indicators in said circuit, and means connected with a car for electrically connecting opposite sides of said circuit intermediate said generators and intermediate said indicators.

30. The combination in an electric circuit, of two opposed electrical generators located in said circuit, a current strength indicator in said circuit, and means connected with a car for intermittently electrically connecting opposite sides of said circuit intermediate said generators.

31. The combination in an electric circuit, of two opposed electrical generators located in said circuit, two current strength indicators in said circuit, and means connected with a car for intermittently electrically connecting opposite sides of said circuit intermediate said generators and intermediate said indicators.

32. The combination in an electric circuit, of two opposed electrical generators located in said circuit, a current strength indicator in said circuit, means connected with a car for electrically connecting opposite sides of said circuit intermediate said generators, and means for controlling the passage of currents through said circuit.

33. The combination in an electric circuit, of two opposed electrical generators located in said circuit, a current strength indicator located in said circuit, means connected with a car for electrically connecting opposite sides of said circuit intermediate said generators, and means on said car for controlling the passage of currents through said circuit.

34. The combination in an electric circuit, of two opposed electrical generators in said circuit, two current strength indicators located in said circuit, means connected with a car for electrically connecting opposite sides of said circuit intermediate said generators and intermediate said indicators, and means for controlling the passage of currents through said circuit.

35. The combination in an electric circuit, of two opposed electrical generators in said circuit, two current strength indicators in said circuit, means connected with a car for electrically connecting opposite sides of said circuit intermediate said generators and intermediate said indicators, and means on said car for controlling the passage of currents through said circuit.

36. The combination in an electric circuit, of two opposed electrical generators in said circuit, a current indicator in said circuit, and means connected with a car for electrically and intermittently connecting opposite sides of said circuit intermediate said generators.

37. The combination in an electric circuit, of two opposed electrical generators in said circuit, two current indicators in said circuit, and means connected with a car for electrically and intermittently connecting opposite sides of said circuit intermediate said generators and intermediate said indicators.

38. The combination in an electric circuit, of two opposed electrical generators in said circuit, a current indicator in said circuit, means connected with a car for electrically and intermittently connecting opposite sides of said circuit intermediate said generators, and means for controlling the passage of currents through said circuit.

39. The combination in an electric circuit, of two opposed electrical generators in said circuit, a current indicator in said circuit, means connected with a car for electrically and intermittently connecting opposite sides of said circuit intermediate said generators, and means on said car for controlling the passage of currents through said circuit.

40. The combination in an electric circuit, of two opposed electrical generators in said circuit, two current indicators in said circuit, means connected with a car for electrically and intermittently connecting opposite sides of said circuit intermediate said generators and intermediate said indicators, and means in said circuit for controlling the passage of currents through said circuit.

41. The combination in an electric circuit, of two opposed electrical generators in said circuit, two current indicators in said circuit, means connected with a car for electrically and intermittently connecting opposite sides of said circuit intermediate said generators and intermediate said indicators, and means on said car for controlling the passage of currents through said circuit.

42. The combination with two sets of signaling apparatus, of two opposed electrical generators, conductors connecting said apparatus and generators in circuit, and means connected with a car for electrically connecting opposite sides of said circuit intermediate said generators and intermediate said two sets of apparatus.

43. The combination with two sets of signaling apparatus, of two opposed electrical generators, conductors connecting said apparatus and generators in circuit, and means connected with a car for connecting electrically opposite sides of said circuit intermediate said two sets of signaling apparatus and intermediate said generators, said connecting means including signaling apparatus carried by the car.

44. The combination with two sets of signaling apparatus, of two opposed electrical generators, conductors connecting said apparatus and generators in circuit, means connected with a car for connecting electrically opposite sides of said circuit intermediate said two sets of apparatus and intermediate said opposing generators, said connecting means including signaling apparatus carried by the car, an electrical generator carried by the car and means for cutting the electrical generator on the car in and out of circuit with the signaling apparatus carried by the car.

45. The combination with two sets of signaling apparatus, of two opposed electrical generators, conductors connecting said apparatus and generators in circuit, means connected with a car for electrically and intermittently connecting opposite sides of said circuit intermediate said two sets of apparatus and intermediate said generators, said connecting means including signaling mechanism carried by the car, an electrical generator carried by the car, and means for cutting the generator on the car in and out of circuit with the signaling apparatus on the car.

46. The combination in an electric circuit, of two current indicators in said circuit, two electrical generators in said circuit, means connected with a car for electrically connecting opposite sides of said circuit intermediate said indicators and intermediate said generators, two extra electrical generators, two variable resistances connected in circuit respectively with said two extra generators, and means for cutting said resistances and extra generators in and out of circuit with said two generators respectively.

47. The combination with a car, of an indicator operative by electric currents, a signaling device in circuit with the said indicator and operative only by stronger currents than are employed to operate said indicator, an electrical generator, conductors in circuit with said generator, and means connected with the car for connecting said conductors in circuit with the indicator and signaling device on said car.

48. The combination with a car, of an indicator, and an electric bell on said car an ! in circuit with each other, the bell being operative only by currents stronger than are normally employed to operate said indicator.

49. The combination with a car, of an electric bell and an indicator in circuit with each other and carried by the car, two conductors and an electrical generator in circuit with each other, means connected with the car for connecting said conductors in circuit with the bell and indicator, the bell being inoperative by the current from said generator, and means for generating in the circuit currents strong enough to operate the bell.

50. In railway signaling apparatus, a current strength recording means having means of indicating the positions of a plurality of trains.

51. In railway signaling apparatus, the combination with a current strength recording means located in an electric circuit, of a current strength regulator in said circuit.

52. In railway signaling apparatus, the combination with a current strength recording means located in an electric circuit, of means for varying the resistance of said circuit.

53. In railway signaling apparatus, the combination with two opposed sources of current in an electric circuit, of a current strength indicator in said circuit, and means connected with a train for locating by said indicator the position of the train.

54. In railway signaling apparatus, the combination with two opposed sources of current in an electric circuit, of means for simultaneously indicating at two points in said circuit the position of a train.

55. In railway signaling apparatus, the combination with two opposed sources of current in an electric circuit, of two current strength indicators in said circuit, and means by which said sources of current are caused to simultaneously denote on said indicators respectively the location of a train.

56. In railway signaling apparatus, the combination with a current strength indicator, of means for sending to said indicator intermittent electrical impulses corresponding in strength to the position of a train.

57. In railway signaling apparatus, the combination with a plurality of current strength indicators, of means for sending simultaneously to said indicators electrical impulses corresponding in strength to the position of a train relative to said indicators.

58. In railway signaling apparatus, the combination with a current strength recording instrument of means by which said instrument may be actuated to indicate simultaneously the positions of a plurality of trains.

59. In railway signaling apparatus, the combination with a single instrument wholly automatic in action, of means by which said instrument indicates by current strength the positions of a plurality of trains.

60. The combination with a system of wiring, of an automatic instrument, and means by which said instrument indicates the direction of a plurality of trains.

61. The combination with a system of wiring, of an automatic instrument, and means by which the directions of a plurality of trains are denoted on said instrument by intermittent electrical impulses traversing said system of wiring.

62. The combination with a single instrument automatic in action, of means by which said instrument indicates the directions of a plurality of trains.

63. The combination with an automatic instrument, of means by which said instrument indicates the directions and positions of a plurality of trains.

64. The combination with an automatic instrument, of means by which said instrument indicates the directions and speed of a plurality of trains.

65. The combination with a current strength recording instrument, of means by which said instrument indicates the positions and speed of a plurality of trains.

66. The combination with an automatic instrument, of means by which said instrument indicates the positions, directions and speed of a plurality of trains.

67. The combination with an instrument for recording current strength, of means by which said instrument is actuated to record the direction of a train.

68. The combination with an instrument for recording current strength, of means by which said instrument is actuated to record the position and direction of a train.

69. The combination with an instrument for recording current strength, of means by which said instrument is actuated to record the direction and speed of a train.

70. The combination with an instrument for recording current strength, of means by which said instrument is actuated to record the position and speed of a train.

71. The combination with an instrument for recording current strength, of means by which said instrument is actuated to record the position, direction, and speed of a train.

72. The combination with an instrument for recording current strength, of means by which said instrument is actuated to record signals from a train.

73. The combination with an instrument for recording current strength, of means by which said instrument is actuated to record the position and direction of a train and signals therefrom.

74. The combination with an instrument for recording current strength, of means by which said instrument is actuated to record the position, direction and speed of a train and signals therefrom.

75. The combination with an instrument for recording current strength, of means by which said instrument is actuated to record the directions of a plurality of trains.

76. The combination with an instrument for recording current strength, of means by which said instrument is actuated to record the speed of a plurality of trains.

77. The combination with an instrument for recording current strength, of means by which said instrument is actuated to record the positions and directions of a plurality of trains.

78. The combination with an instrument for recording current strength, of means by which said instrument is actuated to record the positions and speed of a plurality of trains.

79. The combination with an instrument for recording current strength, of means by which said instrument is actuated to record the directions and speed of a plurality of trains.

80. The combination with an instrument for recording current strength, of means by which said instrument is actuated to record the positions, directions and speed of a plurality of trains.

81. The combination with an instrument for recording current strength, of means by which said instrument is actuated to record the positions of a plurality of trains and signals therefrom.

82. The combination with an instrument for recording current strength of means by which said instrument is actuated to record the directions of a plurality of trains and signals therefrom.

83. The combination with an instrument for recording current strength of means by which said instrument is actuated to record the positions, directions and speed of a plurality of trains and signals therefrom.

84. The combination with an instrument for recording current strength of means by which said instrument is actuated to record the positions and directions of a plurality of trains and signals therefrom.

85. The combination with a single instrument of means for recording with said instrument the position, direction and speed of a train and signals therefrom.

86. The combination with a single instrument of means by which said instrument is actuated to record the positions, directions, and speeds of a plurality of trains and signals therefrom.

87. The combination with a single instrument of means by which said instrument is actuated to record the position and direction of a train and signals therefrom.

88. The combination with a single instrument of means by which said instrument is actuated to record the positions and directions of a plurality of trains and signals therefrom.

89. The combination in an electric circuit, of means for recording current strength, means for generating a current in said circuit, and means on a car for controlling the passage of currents through said circuit.

90. The combination in an electric circuit, of means for recording current strength, means for generating a current in said circuit, and means by which a moving car may intermittently control the passage of currents through said circuit.

91. The combination in an electric circuit, of means for recording current strength, means for generating a current in said circuit, a car, a current indicator on said car, and means for connecting said indicator in circuit with said recording means.

92. The combination with means for recording currents traversing an electric circuit, of means for generating a current in said circuit, a car, a current indicator carried by said car, and means for intermittently connecting said indicator in circuit with said recording means.

93. The combination in an electric circuit, of means in said circuit for recording current strength, signaling means in circuit with said recording means, a car, a current indicator on said car, signaling means on said car and in circuit with said indicator, and means for connecting said indicator and the signaling means on said car in circuit with said recording means.

94. The combination in an electric circuit, of means in said circuit for recording current strength, signaling means in circuit with said recording means, a car, a current indicator, and signaling means on said car and in circuit with each other, and means for intermittently connecting said indicator and signaling means on the car in circuit with said recording means.

95. The combination in an electric circuit, of means in said circuit for recording current strength, a variable resistance, means for cutting the variable resistance in and out of circuit with said recording means, a current generator in circuit with said recording means, a car, and means on said car for opening and closing said circuit, when the car is traveling.

96. The combination in an electric circuit, of means in said circuit for recording current strength, a variable resistance, means for cutting said variable resistance in and out of circuit with said recording means, a current generator in circuit with said variable resistance, a car, an indicator carried by said car, means by which said indicator is connected in circuit with said recording means, and a second generator in circuit with said recording means.

97. The combination in an electric circuit, of means in said circuit for recording current strength, a generator in circuit with said recording means, a variable resistance, means for cutting said variable resistance in and out of circuit with said recording means, a car, an indicator on said car, means for connecting said indicator in circuit with said generator, a variable resistance on said car, and means for cutting the variable resistance on the car in and out of circuit with said generator.

98. The combination in an electric circuit, of opposed electrical generators located in said circuit, an electric lamp located in said circuit, and means connected with a car for electrically connecting opposite sides of said circuit intermediate said generators.

99. The combination in an electric circuit, of two opposed electrical generators located in said circuit, two electric lamps located in said circuit, and means connected with a car for electrically connecting opposite sides of said circuit intermediate said generators and intermediate said lamps.

100. The combination with two conductors forming part of an electric circuit, of an electric lamp located in said circuit, a plurality of contacts connected with one of said conductors, means for generating a current in said circuit, a car, and means carried by the car for connecting successively with said contacts and with the other conductor, said car carried means controlling the passage of the current through said lamp.

101. In a railway signaling system, the combination in an electric circuit, of two electrical generators, a current indicator, and means connected with a car for electrically connecting opposite sides of said circuit intermediate said generators.

102. In a railway signaling system, the combination in an electric circuit, of two electrical generators, a current strength indicator, and means connected with a car for electrically connecting opposite sides of said circuit intermediate said generators.

103. In a railway signaling system, the combination in an electric circuit, of two electrical generators, a current indicator, and means connected with a car by which when the car is traveling opposite sides of said circuit will be intermittently connected intermediate said generators.

104. In a railway signaling system, the combination in an electric circuit, of two electrical generators, a current indicator, a plurality of contacts connected with one side of the circuit, and means connected with a car for successively connecting said contacts with the opposite side of said circuit.

105. In a railway signaling system, the combination in an electric circuit, of two electrical generators, two current indicators, and means connected with a car for electrically connecting opposite sides of said circuit intermediate said generators and intermediate said indicators.

106. In a railway signaling system, the combination in an electric circuit, of two electrical generators, two current indicators, and means connected with a car for intermittently connecting opposite sides of said circuit intermediate said generators and intermediate said indicators.

107. In a railway signaling system, the combination in an electric circuit, of two electrical generators, a current strength indicator, and means connected with a car for electrically connecting opposite sides of said circuit intermediate said generators.

108. In a railway signaling system, the combination in an electric circuit, of two electrical generators, a current strength indicator, and means connected with a car for intermittently connecting opposite sides of said circuit intermediate said generators.

109. In a railway signaling system, the combination in an electric circuit, of two electrical generators, two current indicators, and means connected with a car for intermittently connecting opposite sides of said circuit intermediate said generators and intermediate said indicators.

110. In a railway signaling system, the combination in an electric circuit, of two electrical generators, two current strength indicators, and means connected with a car for intermittently connecting opposite sides of said circuit intermediate said generators and intermediate said indicators.

111. In a railway signaling system, the combination with means for recording current strength, of means for sending to said recording means electrical impulses corresponding in strength to the position of a train.

112. The combination in an electric circuit, of means for recording current strength, and circuit closing means carried by a car.

113. The combination in an electric circuit, of means for recording current strength, and means carried by a car for electrically connecting opposite sides of said circuit.

114. The combination in an electric circuit one side of which is provided with a plurality of contacts, of current strength recording means, and means carried by a car for electrically successively connecting said contacts with the opposite side of said circuit.

115. The combination in an electric circuit, of means for writing records of current strength, and means carried by a car for controlling said recording means.

116. The combination in an electric circuit, of means for writing records of current strength, and means carried by a car for successively actuating said recording means.

117. The combination in an electric circuit, of circuit controlling means carried by a car, and means for writing records of current strength, said records denoting the positions, speed and direction of the car.

118. The combination in an electric circuit, of a plurality of circuit closing means carried respectively by a plurality of cars, and current strength recording means in said circuit.

119. The combination with two electrical circuits, of circuit controlling means carried by a car, a current indicator in one circuit, and a current strength recorder in the other circuit.

120. The combination with two electrical circuits each having on one side a plurality of contacts, of a current indicator in one circuit, a current strength recorder in the other circuit, and means carried by a car for successively electrically connecting the contacts of each circuit with the opposite side of the circuit.

121. The combination in an electric circuit, of means for writing records of current strength, and a current strength indicator, manually operated circuit controlling means, and automatic circuit controlling means carried by a car.

122. The combination with a plurality of electrical circuits each having on one side a plurality of contacts, of a plurality of current strength recorders located one in each circuit, and means carried by a car for successively electrically connecting the contacts of each circuit with the opposite side of the circuit.

123. The combination in an electric circuit, of means for recording current strength, manually controlled means for transmitting currents of different strength in said circuit, a plurality of contacts on one side of said circuit, means carried by a car for successively connecting said contacts with the opposite side of said circuit, a manually operated circuit controller on said car, and a current indicator carried by the car.

In testimony whereof I affix my signature, in the presence of two witnesses.

FRANCIS M. BLACK.

Witnesses:
K. M. IMBODEN,
M. L. LANGE.